United States Patent
Major et al.

(10) Patent No.: US 12,360,815 B2
(45) Date of Patent: Jul. 15, 2025

(54) SYSTEMS AND METHODS FOR DIGITAL WORKFORCE INTELLIGENT ORCHESTRATION

(71) Applicant: BLUE PRISM LIMITED, Warrington (GB)

(72) Inventors: Danny Major, London (GB); Terry Walby, London (GB); Tom Blackburn, London (GB)

(73) Assignee: BLUE PRISM LIMITED ASSIGNEE, Warrington (GB)

( * ) Notice: Subject to any disclaimer, the term of this patent is extended or adjusted under 35 U.S.C. 154(b) by 559 days.

(21) Appl. No.: 17/611,017

(22) PCT Filed: May 15, 2020

(86) PCT No.: PCT/GB2020/051200
§ 371 (c)(1),
(2) Date: Nov. 12, 2021

(87) PCT Pub. No.: WO2020/229843
PCT Pub. Date: Nov. 19, 2020

(65) Prior Publication Data
US 2022/0300336 A1    Sep. 22, 2022

Related U.S. Application Data

(63) Continuation-in-part of application No. 16/413,679, filed on May 16, 2019, now Pat. No. 11,074,105.

(51) Int. Cl.
G06F 9/50 (2006.01)
G06F 9/54 (2006.01)
G06F 11/34 (2006.01)

(52) U.S. Cl.
CPC ............ *G06F 9/5038* (2013.01); *G06F 9/546* (2013.01); *G06F 11/3409* (2013.01)

(58) Field of Classification Search
CPC .. G06F 9/4881; G06F 9/5038; G06F 11/3414; G06Q 10/06316
See application file for complete search history.

(56) References Cited

U.S. PATENT DOCUMENTS

| | | | |
|---|---|---|---|
| 2010/0306779 A1* | 12/2010 | Yengulalp | G06F 9/5038 718/103 |
| 2010/0332876 A1 | 12/2010 | Fields, Jr. et al. | |
| 2019/0044829 A1* | 2/2019 | Balzer | H04L 51/214 |
| 2019/0066013 A1* | 2/2019 | Gupta | G06N 7/01 |
| 2019/0332508 A1* | 10/2019 | Goyal | G06F 11/3414 |
| 2020/0004798 A1* | 1/2020 | Weinert, Jr. | G06F 16/9577 |

(Continued)

FOREIGN PATENT DOCUMENTS

JP    2018-041296 A    3/2018

OTHER PUBLICATIONS

Akshay Kumar, Government of India Examination Report, Jul. 19, 2023, Delhi, India.

(Continued)

*Primary Examiner* — Dong U Kim
(74) *Attorney, Agent, or Firm* — Pierson IP, PLLC (57) ABSTRACT

Examples of the present disclosure are related to systems and methods for digital workforce intelligent orchestration. Specifically, embodiments are related to prioritizing and ordering a workflow by managing robotic process automation (RPA) bots.

13 Claims, 6 Drawing Sheets

(56) References Cited

U.S. PATENT DOCUMENTS

2020/0026263 A1* 1/2020 Haberkern .......... H04L 41/5022
2020/0065334 A1* 2/2020 Rodriguez ............. G06F 40/35

OTHER PUBLICATIONS

Astorga Cornejo Joaquin Custodio, Expert Report On Invention Patent Application, National Institute of Industrial Property, May 6, 2023, Chile.
Astorga Cornejo Joaquin Custodio, Search Report On Patent of Invention Application, National Institute of Industrial Property, Chile.
Kathryn Marcynuk, Canadian Examination Search Report, Sep. 7, 2023, Canada.
Nakano, Shuhei, JP Office Action dated Dec. 27, 2023.
Carl Witt et al: "Predictive Performance Modeling for Distributed Computing using Black-Box Monitoring and Machine Learning", arxiv.org, Cornell University Library, 201 Olin Library Cornell University Ithaca, NY 14853, May 30, 2018 (May 30, 2018), XP081137994, DOI: 10.1016/J.IS.2019.01.006.
Wang Kewen et al: "Design and implementation of an analytical framework for interference aware job scheduling on Apache Spark platform", Cluster Computing, Baltzer Science Publishers, Bussum, NL, vol. 22, No. 1, Dec. 23, 2017 (Dec. 23, 2017), pp. 2223-2237, XP036884637, ISSN: 1386-7857, [retrieved on Dec. 23, 2017], DOI: 10.1007/S10586-017-1466-3.

* cited by examiner

SYSTEMS AND METHODS FOR DIGITAL WORKFORCE INTELLIGENT ORCHESTRATION

BACKGROUND INFORMATION

Field of the Disclosure

Examples of the present disclosure are related to systems and methods for digital workforce intelligent orchestration. Specifically, embodiments are related to managing, prioritizing, and ordering execution of tasks by robotic process automation (RPA) bots.

Background

RPA is an emerging form of business process automation technology utilizing software robots or artificial intelligence (AI) workers (referred to hereinafter individually and collectively as "bots"). In conventional workflow automation tools, a software developer produces a list of actions to automate a task using internal application program interfaces. In contrast, RPA systems develop an action list by watching a user perform a task in the application's graphical user interface, and then perform the automation by repeating those tasks directly on the graphical user interface.

Conventionally, digital workers are viewed as a cost effective way of displacing or transferring digital work from users. However, a variety of factors often lead the bots to being underutilized. Further, as digital workforces increase in size, it is difficult to determine that the bots are working on desired tasks for the enterprise.

Current systems utilize bots in a variety of inefficient or less than optimal ways, including: a first in first out technique, manual intervention to determine what tasks to perform, grouping of tasks with queues having varying levels of priorities, and scheduling. However, these techniques are procedural and are time intensive to set up, while not taking into consideration task level business priorities and/or service agreements, dynamic variables, and trends to predict the likelihood of work and corresponding tasks being generated.

Accordingly, needs exist for more efficient and effective systems and methods to manage and allocate RPA bots by leveraging an orchestration layer to conserve systems resources while completing tasks in a shorter period of time.

SUMMARY

Embodiments described herein are directed towards systems and methods for prioritizing and ordering a workflow by managing, commissioning, and ordering RPA bots. Embodiments are configured to allow for RPA bots to emulate user tasks, wherein the output of an RPA bot increases as the RPA bot becomes more aware of the application landscape that it is provisioned on. Embodiments may utilize a task queuing system configured to allow work and tasks to be managed based on business priorities, service level agreements, and other factors. Embodiments may include an orchestration layer that is configured to manage RPA bots for a series of channels where work is generated.

Embodiments may include channels, API hardware, task queuing hardware, application prediction models hardware, task profile predictive models hardware, orchestration layer hardware, and RPA bots.

The channels may be tasks or work (referred to hereinafter individually and collectively as "tasks") created for task queuing hardware. The tasks may be received from a self-service web form, PDF that is processed by an OCR engine, chat bot, email or SMS, existing line of business system or application or triggered through an API, or any other task that requires computing processing. The tasks may be configured associated with any computing resource where a user could perform a task in an application's graphical user interface.

The API hardware may be initiated within an enterprise suite to trigger queuing of tasks at the task queuing hardware. The API hardware may be configured to determine types of tasks, priorities, etc. for different systems. The priorities of work may be determined by AI or by user actions to order the prioritizations of tasks to be completed.

The task queuing hardware may be configured to receive tasks from channels via the API hardware, determine tasks to be completed in what order and when, and manage the RPA bots in association with the queued tasks.

The orchestration hardware may be configured to be a controller that distributes work to the RPA bots as the RPA bots become available. The orchestration hardware may be configured to determine a current queue of tasks which are to be completed and determine which tasks to process based on the inputs from the application predictive model hardware and the task profile predictive model hardware. Based on inputs from the model hardware, the orchestration hardware may dynamically determine, without the need for fixed rules, an ever-changing landscape of disparate work times for tasks and application trends.

The application predictive model hardware may be configured to determine a predictive analysis to determine the future expected performance of the RPA bots in association with queued tasks within a given time span. This may enable throughput increase in a number of tasks a RPA bot can execute within a given time span. The efficiency of the RPA bots may be associated with the duration of time required to perform a task at a given time, based on other system requirements, length of time required for the RPA bot to perform a task, and/or a combination.

The task profile predictive model hardware may be configured to determine when tasks of certain types will be queued on the task queueing hardware, and for any task what priority level will be assigned. Based on the determinations by the task profile prediction model of quantity and types of tasks to be received, task queueing hardware may not assign RPA bots for all the current tasks, and suspend at least one RPA bot until a higher priority task is likely to be received.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
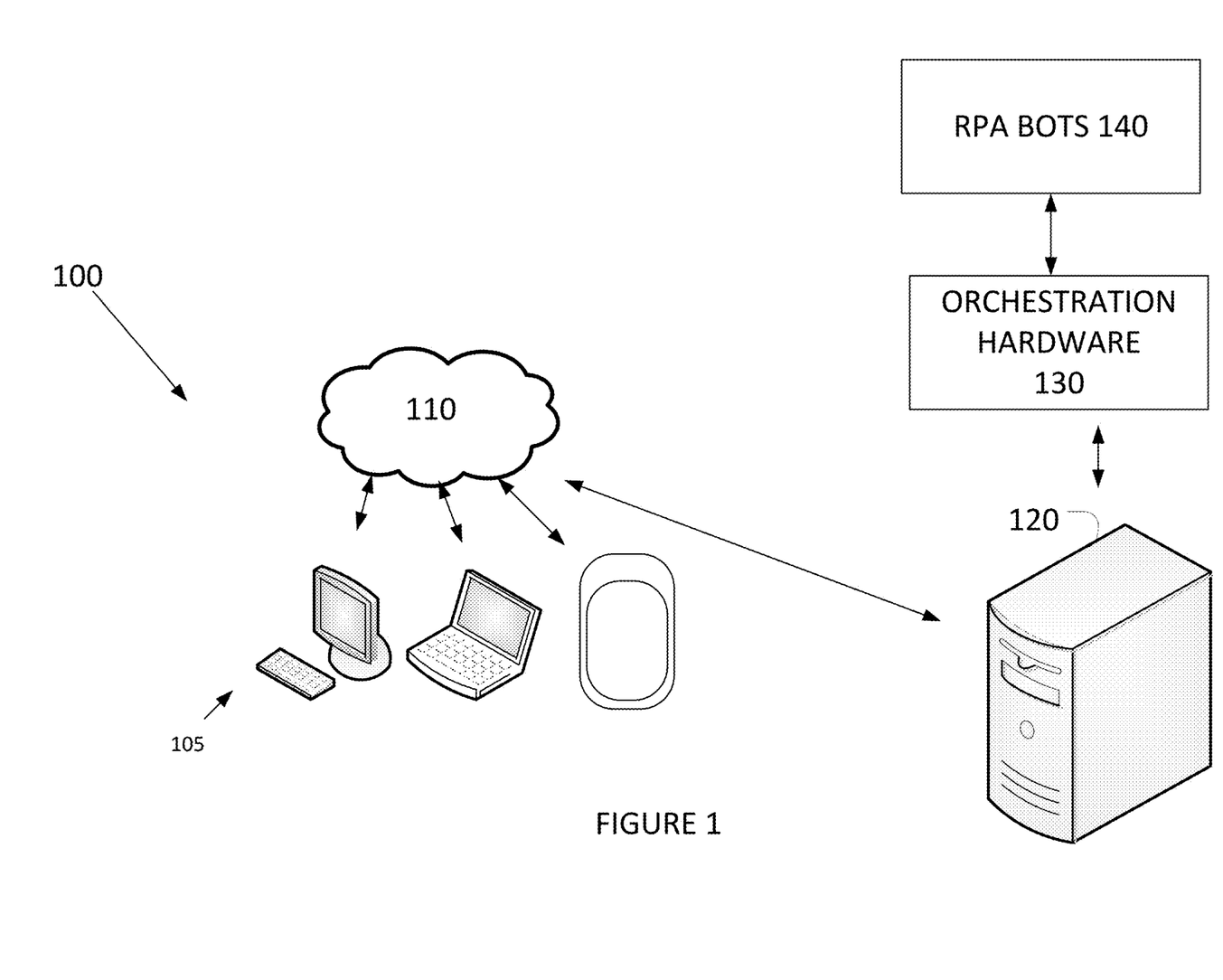
FIG. 1 depicts one topology for digital workforce intelligent orchestration, according to an embodiment.

Turning now to FIG. 1, FIG. 1 depicts one topology for digital workforce intelligent orchestration. Embodiments may be configured to drive effective and efficient utilization of RPA bots, allowing for more work to be completed in shorter time frames. Topology 100 may include client computing devices 105 for work/task creation and server 120 that are configured to be communicatively coupled over network 110.

Network 110 may be a wired or wireless network such as the Internet, an intranet, a LAN, a WAN, a NFC network, Bluetooth, infrared, radio frequency, a cellular network or another type of network. It will be understood that network 110 may be a combination of multiple different kinds of wired or wireless networks all resulting in tasks being created in a Queue.

Client computing devices 105 may be a smart phone, tablet computer, laptop computer, a computer, personal data assistant, or any other type of mobile device with a hardware processor that are configured to process instructions and connect to one or more portions of network 130. Client computing devices 105 may have a graphical user interface that is configured to allow a user to interact with a processor of client computing device 105 to create work. In embodiments, the work and corresponding tasks are configured to be transmitted to server 120 over network 110. The work and tasks may be associated with a self-service web form, a PDF that is processed by an OCR engine, a chat bot, an email or SMS, an existing line of business system or application or triggered through an API, etc. In embodiments, each of the tasks may have associated keystrokes, inputs on a graphical user interface, or other actions that may be performed by a user. These tasks may also be completed by an RPA bot 140 performing the actions instead of the user based on metadata associated with the tasks, such as the required keystrokes on the graphical user interface. For example, tasks generated by client computing device 105 may be associated with populating a work profile and privileges for a user on a network.

Server 120 may be a computing resource that is configured to remotely provision, allocate, manage, and control RPA bots 140 to execute tasks generated by client computing devices 105. Server 120 may be configured to set business metrics and initiate tasks through an entry point API. The entry point API of server 120 may be initiated in a variety of way within an enterprise through any of the client computing devices 105, automatically triggered, or a combination. Server 120 may be configured to allow organizations to have different tasks with different priorities to be completed first by RPA bots 140. The business metrics may be weightings, such as organization priorities, service level agreements, and operation level agreements that can be associated to either the process or task level. The business metrics associated with different tasks may be autonomously created by server 120 and/or set by a human user.

Server 120 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Server 120 may include any combination of one or more computer-usable or computer-readable media. For example, server 120 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device.

In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In embodiments, server 120 may be configured to commission and decommission RPA bots based on service level agreements, tasks queued, and/or a combination. For example, server 120 may be configured to allocate computing resources to increase a number of RPA bots 140 based on computing resources to complete tasks currently queued and predicted future tasks. For example, server 120 may be configured to determine a time frame required to complete the current set of tasks by a single RPA bot 140. If the determined time frame is greater than a time threshold, server 120 may to determine a second time frame required to complete the current set of tasks by a number RPA bots 140, wherein the second time frame is less than the time threshold. This determination may be dynamically made each time an RPA bot 140 completes a given task based on updated models associated with the RPA bot 140 completing the task.

Server 120 may include task queueing hardware, orchestration hardware 130, and RPA bots 140.

The task queueing hardware may be configured to receive tasks from client computing devices 105 to be executed by an RPA bot 140. The task queuing hardware may be configured to determine what RPA bot 140 performs what task and when, which may be a current time or a time in the future. Responsive to the task queueing hardware receiving a task or work to be completed over a channel from client computing device 105, the task queuing hardware may assign a business or metric weighting to the task. Based on the weighting, service level agreement, predictive models, etc. the task queueing hardware may provision computing resources, such as an RPA bot 140 to perform the task or manage the task in a queue. In embodiments, a task may remain in the task queueing hardware until an RPA bot 140 completes another task. The task queuing hardware may also be configured to store a repository of task blueprints associated with a task. The task blueprints may include inputs to be entered by an RPA bot 140 associated with the task.

Orchestration hardware 130 may be a hardware computing device that is configured to be a controller to distribute work to an RPA bot 140. Orchestration hardware 130 may determine tasks queued at the task queueing hardware which are to be completed, and through machine learning determine which item to allocate to an RPA bot 140 based on an application predictive model and a task profile predictive model. The two models may be configured to allow for orchestration hardware 130 to make determinations dynamically without the need for fixed rules. Orchestration hardware 130 may utilize recursive and continuous algorithms to determine the most effective and efficient uses of RPA bots 140 for current and expected future tasks, at each instance once an RPA bot 140 has completed a task.

RPA bots 140 may be software configured to perform tasks by a prescribed run book of key strokes that an RPA bot 140 completed against the line of business systems and applications, emulating the interactions of a human user. RPA bots 140 may be configured to be software positioned on a dedicated operating system, an automatically perform assigned tasks. RPA bots 140 may also be configured to generate data responsive to completing tasks. The data generated by RPA bots 140 may include a given time period to complete a specific task, computing resources to complete the specific task, etc.

Figure 2:
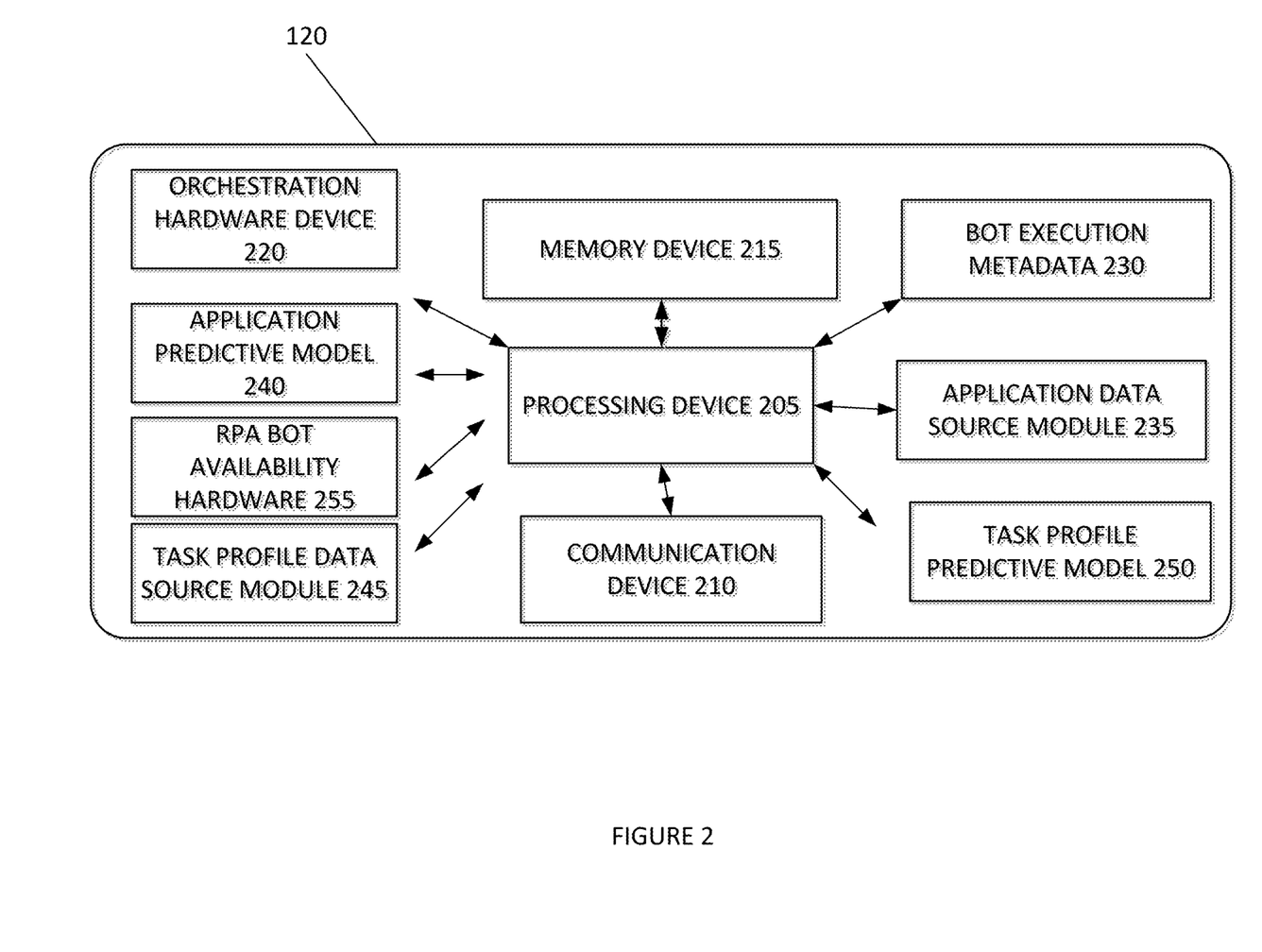
FIG. 2 depicts one embodiment of server, according to an embodiment.

FIG. 2 depicts one embodiment of server 120. One skilled in the art will appreciate that certain elements associated with sever 120 may be locally stored at client computing device 105. Accordingly, elements described below may also be stored at client computing device 105.

Server 120 may include a processing device 205, a communication device 210, a memory device 215, orchestration hardware device 220, bot execution metadata 230, application data source module 235, application predictive model 240, task profile data source module 245, task profile predictive model 250, and RPA availability hardware 155.

Processing device 205 may include memory, e.g., read only memory (ROM) and random access memory (RAM), storing processor-executable instructions and one or more processors that execute the processor-executable instructions. In embodiments where processing device 205 includes two or more processors, the processors may operate in a parallel or distributed manner. Processing device 205 may execute an operating system of server 120 or software associated with other elements of server 120.

Communication device 210 may be a device that allows server 120 to communicate with another device over network 130. Communication device 210 may include one or more wired/wireless transceivers for performing wireless communication over network 110. Communication device 210 may be configured to receive tasks from client computing devices 105, and transmit data associated with tasks completed associated with RPA bots 140 to the client computing devices 105.

Memory device 215 may be a device that stores data generated or received by server 110. Memory device 215 may include, but is not limited to a hard disc drive, an optical disc drive, and/or a flash memory drive. In embodiments, memory device 215 may be configured to store information received from a client computing device 105, such as business metrics, rules, etc. memory device 215 may also be configured to store metadata associated with tasks, data associated with predictive models, and data associated with RPA bots 140.

Orchestration hardware device 220 may be a hardware processing device may be configured to determine what tasks are stored within the task queueing system need to be completed, weighting associated with each of the tasks, analyzing predictive models of what tasks are likely to be required to be performed in a given time frame, analyze the software applications associated with the tasks to be completed by the RPA bots 140, and determine a length of time and computing resources for the RPA bot 140 to complete the task. As such, orchestration hardware device 220 may be configured to manage RPA bots 140 for tasks currently in task queuing hardware, and tasks predicted to be in task queuing hardware, and managing computing resources to commission and decommission RPA bots 140 based on the current and predictive future tasks and the RPA bots efficiency.

Bot execution metadata 230 may be a hardware processing device configured to determine metadata associated with an RPA bot completing a specific task. The metadata may include computing resources required for the RPA bot 140 to complete the task, operating systems required to complete the task, files required to complete the task, internet protocols required to complete a given task. This metadata may be stored within memory device 215 and used by subsequent RPA bots 140 to complete similar tasks. As such, multiple RPA bots 140 may utilize the metadata stored in a file repository to complete the task, which may lead to the RPA bots 140 being more efficient while limiting the required computing resources to perform a task. The bot execution metadata 230 may also include the procedural steps that are required to complete the tasks when an RPA is performing actions on a client device to complete the tasks. In embodiments, the procedural steps may be set by a user before the RPA bot 140 performs a task, or autonomously recorded by bot execution metadata 230 responsive to the user performing the task.

Application data source 325 module may be a hardware processing device configured to generate metadata based on performance metrics of an RPA bot completing a task for a software program. For example, performance metrics may include application performance across a unit of time. As an RPA bot 140 executes an automated process interactions performance metrics may be determined. For example, performance metrics may be collected when a software application is started by an RPA bot, the RPA bot logs into an application, and RPA bot navigates through different pages The metadata collected relates to application performance opposed to personal data about a process.

Application predictive model 240 may be a hardware processing device configured to determine a predictive analysis to control the future expected performance of software applications within a given timespan. For example, based on the available datasets, application predictive model may determine that a first software application performs 15% slower at 09:23 compared to a 23% performance increase should the first software application be used at 10:54. The predictive analysis may be based on average computing resources required by server 120 at different periods of times for multiple RPA bots to execute different tasks. The predictive analysis may lead to a throughput increase in the number of tasks a RPA bot 140 can execute within a given day based on the performances of the different software applications at different times. In embodiments, the predictive analysis and models operate within the desired business metric provided.

Task profile data source module 245 may be a hardware processing device configured to generate metadata based on the profile of tasks within a business or business unit before or after a task is queued within a task queuing system. Responsive to receiving a task from the client computing devices, bot execution metadata 235 may determine properties of the tasks. The properties may include data such as requestor, associated business process, time and other values are tracked in order to build a view of common tasks types. These property values may be utilized by the models to determine profiles of the tasks.

Task profile predictive model 250 may be a hardware device configured to determine when tasks of certain types will be received by the task queueing hardware. Task profile predictive model 250 may be configured to determine what types of tasks may be received when based on historic data. For tasks of having a priority level above a threshold, may determine a probability above a threshold when these tasks will be received, such that an RPA bot 140 may be kept idle/suspended. This may allow the RPA bot 140 to execute actions to perform the task responsive to receiving the task. Should a predicted task not be generated within the predicted window, then other tasks will be executed by the RPA bot 140 in its place.

RPA bot availability hardware 255 is configured to determine if orchestration hardware 120 has sufficient deployed RPA bots to complete the current tasks in the task queue system and predictive future tasks with respect to the efficiency of the corresponding applications. Responsive to an RPA bot 140 completing a task, RPA bot availability hardware 255 may determine the predicted amount of time required for the current amount of provisioned RPA bots to complete each task within the queue and predictive tasks that will be in the queue within a given time period. If the predictive amount of time is lower than the given time period, RPA bot availability hardware 255 may decrease the number of provisioned RPA bots to conserve computing resources. If the predictive amount of time is greater than the given time period, RPA bot availability hardware 255 may increase the number of provisioned RPA bots for efficiency purposes. By determining the predicted amount of time responsive to an RPA bot 140 completing a task, the predicted amount of time may dynamically and continuously change to optimize computing resources.

Figure 3:
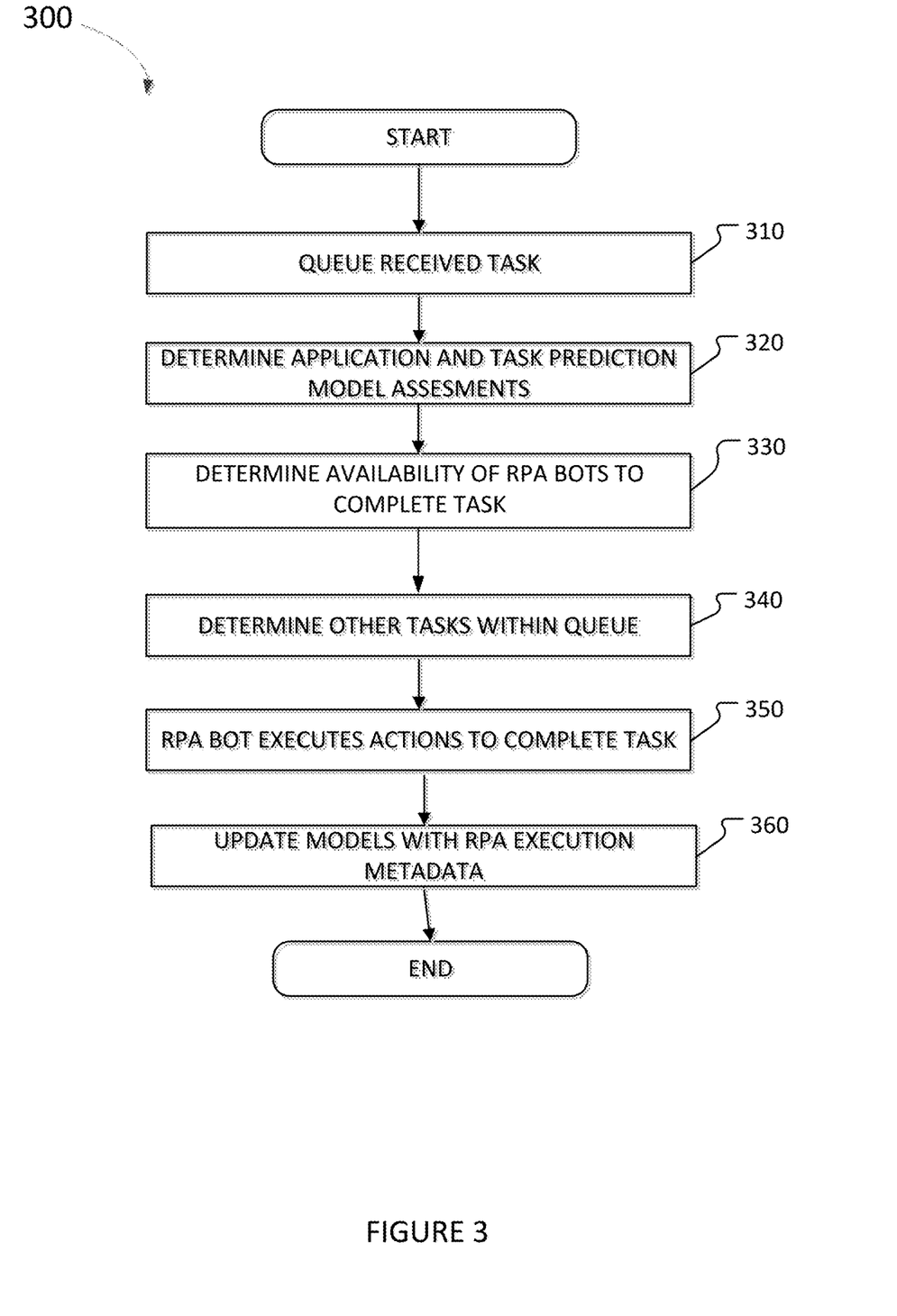
FIG. 3 depicts a method for an RPA bot to execute actions to complete a queued task, according to an embodiment.

FIG. 3 illustrates a method 300 for an RPA bot to execute actions to complete a queued task, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 310, a task to be completed may be received. In embodiments, a received task may be assigned a priority weighting and properties. The properties may include a name of the task, data and time the task was received, data and time the task should be completed, a unique identifier associated with the requestor. The tasks may be defined by a prescribed run book of keystrokes to be completed by an RPA bot against a line of business systems and software applications, which may emulate the interactions of a human user.

At operation 320, a task queueing system may determine the computing resources to process all tasks in the queue in real time. Further, an application predictive model may determine the future expected performance of applications associated with tasks within a first time span, and a task profile predictive model may determine predications of tasks that will be received within a second time span. In embodiments, the first time span and the second time span may be the same or different periods of time that may or may not overlap.

At operation 330, an orchestration hardware system may determine if an RPA bot is available to perform the received task based in part on, the availability of a bot, priority associated with the task the metadata associated with the received task, the profile predictive model and the application prediction model.

At operation 340, the orchestration hardware system may determine if the RPA bot should perform the received task, another task within the queue, or remain idle.

At operation 350, the RPA bot may execute actions to complete the task.

At operation 360, the task predictive model and the application predictive model may be updated based on the RPA bot executing actions to complete the task. The predictive models may be updated responsive to the bot completing the task, and the RPA bot becoming available. As such, the RPA predictive models may be updated between the time it takes the RPA bot to perform a first task and a second task.

Figure 4:
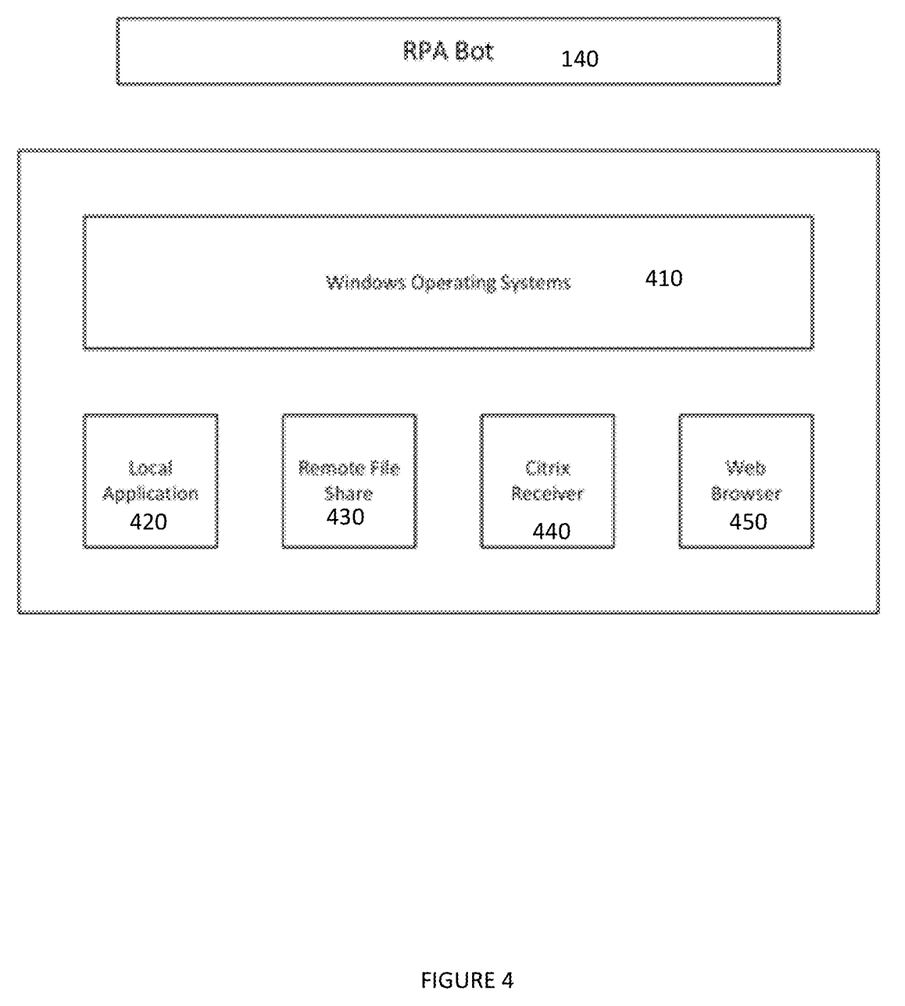
FIG. 4 depicts an RPA bot, according to an embodiment.

FIG. 4 depicts an RPA bot 140, according to an embodiment. Elements depicted in FIG. 4 are described above, and for the sake of brevity these elements may not be described again.

As depicted in FIG. 4, RPA bot 140 may have a corresponding action list of tasks to perform, which may be generated by a user entering the action list or by copying actions that a user performed for the same task in an applications graphical user interface. RPA bot 140 may then be able to autonomously perform that action list directly on the GUI without user's assistance. RPA both may include an associated operating system 410, local application 420, remote file share 430, Citrix receiver 440, and browser 450.

The operating system 410 may allow RPA bot 140 to execute software installed on RPA bot 140. The executed software may enable RPA bot 140 to control a local application 420, utilizing data stored in remote file share 430 via receiver 440 and browser 450.

Figure 5:
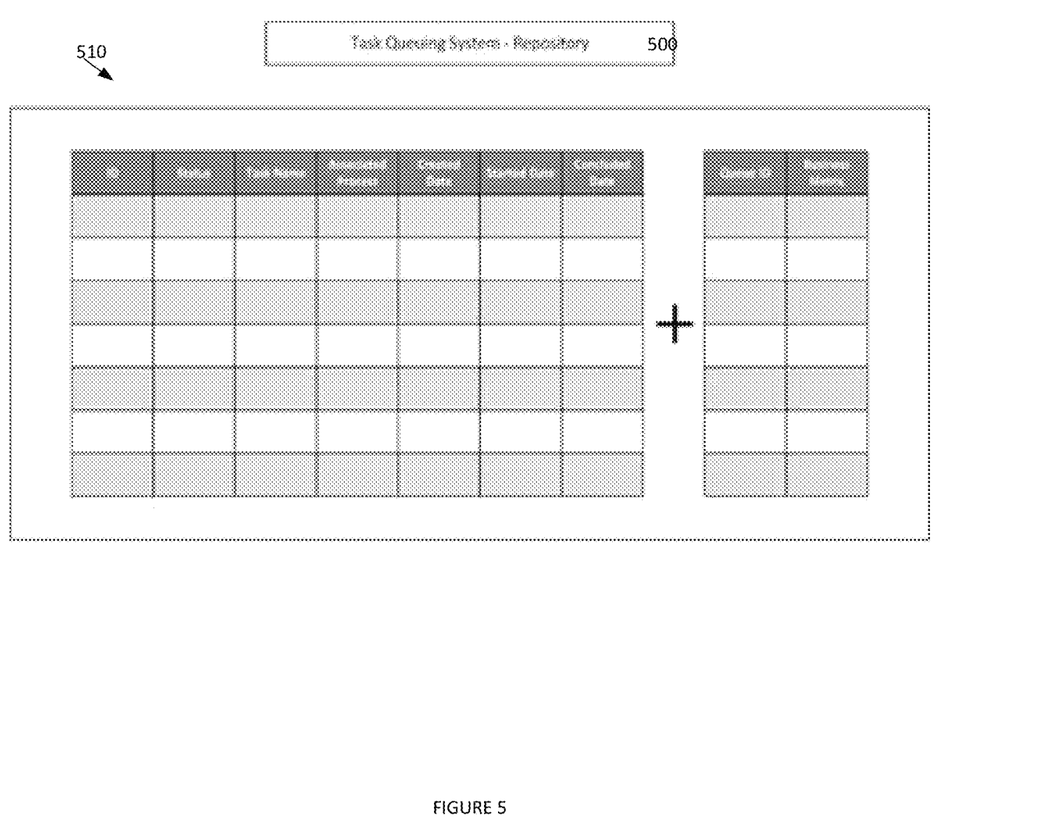
FIG. 5 depicts a task queuing system, according to an embodiment.

FIG. 5 depicts an task queuing system 500, according to an embodiment. Elements depicted in FIG. 5 are described above, and for the sake of brevity these elements may not be described again.

Responsive to server 120 receiving a task, task queuing system 500 may be configured to add a task to the queue 510. Responsive to an RPA bot completing a task, the task may be removed from the queue 510. Each task added to the queue may have corresponding metadata, such as a unique identifier, status, name, associated applications, data created, started data, concluded data, number on the queue, and business metrics. In embodiments, the business metrics may include a business priority, business service level agreement, a priority value and a time value.

The business priority may be associated with a numerical value of importance, where a higher value may indicate a higher level of importance. The numerical value may be set by user interaction or be set based on the identification of the task. The time value may be a period of time where the task is required to be performed in. The business service level agreement may indicate a minimum and/or maximum number of RPA bots that can be allocated to a given task queueing system, wherein if there are more RPA bots than tasks based on the business service level agreement there may be idle RPA bots.

Figure 6:
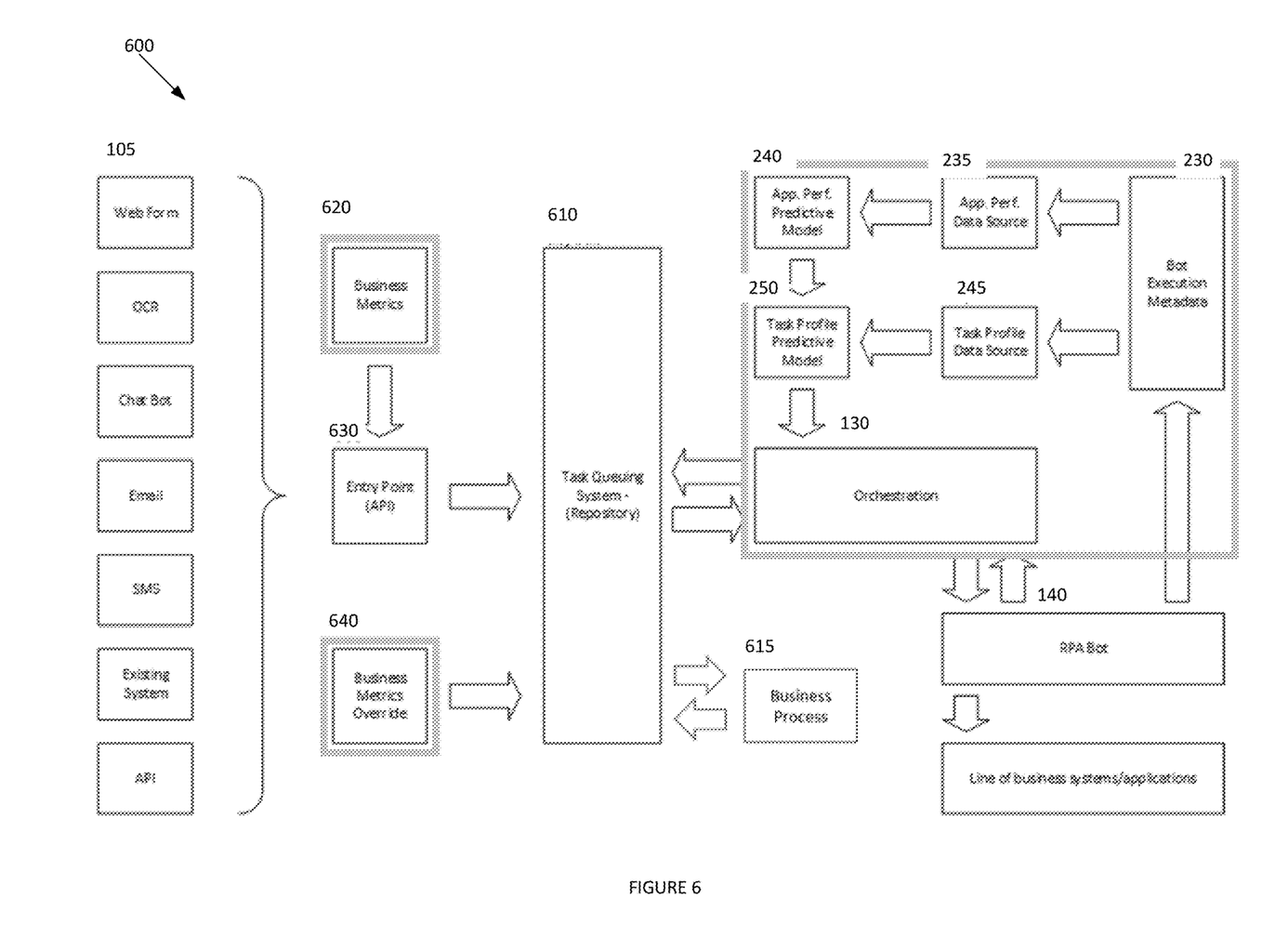
FIG. 6 depicts one topology for digital workforce intelligent orchestration, according to an embodiment.

FIG. 6 depicts one topology for digital workforce intelligent orchestration, according to an embodiment. Elements depicted in FIG. 6 may be described above, and for the sake of brevity another description of these elements is omitted.

As depicted in FIG. 6, work or tasks may be entered into a working environment, or entry point API 630, through different channels 105. The entry point API 630 may also receive business metrics 620, such as organization priorities, service level agreements, and operation level agreements that can be associated to either the process or task level.

The entry point API 630 may be in communication with a task queuing system 610. The task queuing system 610 may also receive a business metrics override 640 that allows a user to enter data associated with the prioritization of tasks or work. Task queuing system 610 may also receive business processes 615, which may be a repository of task blueprints or data to be performed by RPA bots 140 to complete a task.

Orchestration hardware 130 may be configured to be a controller that distributes work from task queueing system 610 to RPA bots 140, and communicates data to task queueing system 610 that indicates that an RPA bot 140 has completed a task. Orchestration hardware 130 may also be configured to distribute task to bots based on data from task profile predictive model 250.

Bot execution metadata 230 may include data associated with data collected responsive to an RPA bot 140 completing a task. This collected data may be simultaneously transmitted to application data source module 235 and task profile data source module 245. This data may then be simultaneously used by application predictive model 240 and task profile predictive model 250 to update orchestration hardware 130 responsive to a task being completed by RPA bot 140.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

The following is a list of embodiments which may be claimed:

1. A system for digital workforce intelligent orchestration:
a task queuing system configured to receive a first task;
a first robotic process automation bot configured to execute actions to perform the first task;
orchestration hardware configured to manage the first robotic process automation bot to execute the actions to perform the first task based on an application predictive model and a task predictive model, wherein the application predictive model is configured to determine an exceptive performance of computing resources associated with the first task at a first time period compared to a second time period, and the task predictive model is configured to determine future tasks to be added to the task queuing system over a segment of time.
2. The system of embodiment 1, wherein the orchestration hardware is configured to commission and decommission a second robotic process automation bot responsive to the robotic process automation bot responsive to the first robotic process automation bot executing actions to perform the first task.
3. The system of embodiment 1, wherein the task predictive model is configured to determine the future tasks to be added to the task queuing system based on a history of tasks added to the task queuing system.
4. The system of embodiment 1, wherein the first robotic process automation bot is configured to generate metadata based on performance metrics of the first robotic process automation bot executing actions to perform the first task.
5. The system of embodiment 1, wherein the first task includes a prescribed run book of keystrokes associated with a client computing device that will be automated by the first robotic process automation bot.
6. The system of embodiment 1, wherein the first task includes business metrics, the business metrics being assigned a numerical value based on priority.
7. The system of embodiment 1, wherein the task queuing system receives a second task, wherein to conserve the computing resources the orchestration hardware idles the first robotic process automation bot while the second task is within the task queuing system based on the application predictive model and the task predictive model.
8. The system of embodiment 7, wherein the second task is the only task in the task queuing system.
9. The system of embodiment 1, wherein the task queueing system is configured to determine an amount of the computing resources requires to complete all received tasks over the segment of time.
10. The system of embodiment 1, wherein the exceptive performance of computing resources associated with the first task at the first time period compared to the second time period is based on a percentage of computing resources required for the first robotic process automation bot to perform the first task at the first time period and the second time period.
11. A computer implemented method for digital workforce intelligent orchestration, the method comprising:
receiving a first task;
executing, via a first robotic process automation bot, actions to perform the first task;
managing, via orchestration hardware, the first robotic process automation bot to execute the actions to perform the first task based on an application predictive model and a task predictive model;
determining an exceptive performance of computing resources associated with the first task at a first time period compared to a second time period; and
determining future tasks to be added to the task queuing system over a segment of time.
12. The method of embodiment 11, further comprising:
commissioning and decommissioning a second robotic process automation bot responsive to the robotic process automation bot responsive to the first robotic process automation bot executing actions to perform the first task.
13. The method of embodiment 11, further comprising:
determining the future tasks to be added to the task queuing system based on a history of tasks added to the task queuing system.
14. The method of embodiment 11, further comprising:
generating metadata based on performance metrics of the first robotic process automation bot executing actions to perform the first task.
15. The method of embodiment 11, wherein the first task includes a prescribed run book of keystrokes associated with a client computing device that will be automated by the first robotic process automation bot.
16. The method of embodiment 11, wherein the first task includes business metrics, the business metrics being assigned a numerical value based on priority.
17. The method of embodiment 11, further comprising:
receiving a second task;
idling the first robotic process automation bot while the second task is within the task queuing system based on the application predictive model and the task predictive model; and
conserving the computing resources by idling the first robotic process automation bot.
18. The method of embodiment 17, wherein the second task is the only task in the task queuing system.
19. The method of embodiment 11, further comprising:
determining an amount of the computing resources requires to complete all received tasks over the segment of time.
20. The method of embodiment 11, wherein the exceptive performance of computing resources associated with the first task at the first time period compared to the second time period is based on a percentage of computing resources required for the first robotic process automation bot to perform the first task at the first time period and the second time period.

What is claimed is:

1. A computer-implemented method for digital workforce intelligent orchestration of tasks to be completed by Robotic Process Automation, RPA, bots, the method comprising:
receiving a first task at a task queuing system;
managing, via orchestration hardware configured to distribute work to the RPA bots as they become available, the RPA bots including a first RPA bot, wherein managing includes determining if the first RPA bot should perform the received first task based on an application predictive model and a task predictive model;
wherein the application predictive model determines a future expected performance of software applications associated with the tasks to be completed by the RPA bots in association with the queued first task at different periods of time and the task predictive model determines future tasks to be added to the task queuing system over a segment of time; and in response to determining that the first RPA bot should perform the received first task, executing, via the first RPA bot, actions to perform the first task, wherein metadata is collected responsive to the first RPA bot completing the first task, and the collected metadata is used to simultaneously update the application predictive model and the task predictive model.

2. The method of claim 1, further comprising commissioning and decommissioning a second robotic process automation bot based on service level agreements and/or tasks queued.

3. The method of claim 1, further comprising determining the future tasks to be added to the task queuing system based on a history of tasks added to the task queuing system.

4. The method of claim 1, further comprising generating metadata based on performance metrics of the first RPA bot executing actions to perform the first task.

5. The method of claim 1, wherein the first task includes a prescribed run book of keystrokes associated with a client computing device that will be automated by the first RPA bot.

6. The method of claim 1, wherein the first task includes business metrics, the business metrics being assigned a numerical value based on priority.

7. The method of claim 1, further comprising:
receiving a second task, idling the first RPA bot while the second task is within the task queuing system based on the application predictive model and the task predictive model; and
conserving computing resources by idling the first RPA bot.

8. The method of claim 7, wherein the second task is the only task in the task queuing system.

9. The method of claim 1, further comprising determining an amount of computing resources required to complete all received tasks in real time.

10. The method of claim 1, further comprising:
determining an amount of time required for a current amount of provisioned RPA bots to complete each task within the task queuing system and the future tasks predicted by the task predictive model over a given time period, wherein if the determined amount of time is lower than the segment of time, decreasing a number of provisioned RPA bots and if the determined amount of time is greater than the segment of time, increasing the number of provisioned RPA bots.

11. The method of claim 1, further comprising:
determining the computing resources required for the RPA bot to complete the received task; managing the RPA bot for tasks currently in the task queuing system and tasks predicted to be in the task queuing system; and managing computing resources to commission and decommission RPA bots based on current and predictive future tasks in the task queuing system and efficiency of the RPA bots.

12. A computer program product stored within a computer comprising instructions which, when the computer program product is executed by the computer, cause the computer to carry out the method of claim 1.

13. A server comprising means for carrying out the method claim 1, the server comprising the task queuing system, the orchestration hardware and the first RPA bot.

* * * * *